United States Patent [19]

González et al.

[11] Patent Number: 4,882,001
[45] Date of Patent: Nov. 21, 1989

[54] PHOTOINITIATOR CROSSLINKABLE MONOMER COMPOSITIONS AS ADHESIVES AND METHOD OF USING

[75] Inventors: RenéA. A. González, Duessledorf; Heinz-Christian Nicolaisen; Lothar Kammer, both of Hanover, all of Fed. Rep. of Germany

[73] Assignee: Henkel Kommanditgesellschaft auf Aktien, Duesseldorf, Fed. Rep. of Germany

[21] Appl. No.: 225,323

[22] Filed: Jul. 27, 1988

[30] Foreign Application Priority Data

Jul. 27, 1987 [DE] Fed. Rep. of Germany ....... 3724838

[51] Int. Cl.[4] .............................. C09J 3/00; C09J 5/00
[52] U.S. Cl. ................... 156/273.3; 156/275.7; 156/332
[58] Field of Search ................. 156/275.5, 275.7, 332, 156/273.3; 522/27, 29; 523/115, 116

[56] References Cited

U.S. PATENT DOCUMENTS

| | | | |
|---|---|---|---|
| 3,753,922 | 4/1971 | Rust | 96/115 |
| 4,356,050 | 10/1982 | Crivello et al. | 156/330 X |
| 4,533,446 | 8/1985 | Conway et al. | |
| 4,657,941 | 4/1987 | Blackwell et al. | 522/27 X |
| 4,731,146 | 3/1988 | Clark | 156/314 |
| 4,735,632 | 4/1988 | Oxman et al. | 430/332 |
| 4,795,823 | 1/1989 | Schmitt et al. | 523/120 |

OTHER PUBLICATIONS

J. Hutchinson et al., "Advances in Polymer Sciences", 14, 49 (1974).
G. Oster & N. L. Yang, "Chemical Reviews" 68, 125 (1968).

*Primary Examiner*—Michael W. Ball
*Assistant Examiner*—Steven D. Maki
*Attorney, Agent, or Firm*—Ernest G. Szoke; Wayne C. Jaeschke; Henry E. Millson Jr.

[57] ABSTRACT

Monomer compositions crosslinkable by photoinitiators and stabilizers and containing liquid polymerizable monomers having one or more ethylenic double bonds, camphor quinone, an aryl sulfinate, thickeners, and, optionally, adhesion promoters and/or accelerators as photoinitiated adhesives hardening in darkness for the bonding of non-transparent surfaces. Bonds having excellent tensile shear strengths are obtained.

8 Claims, No Drawings

PHOTOINITIATOR CROSSLINKABLE MONOMER COMPOSITIONS AS ADHESIVES AND METHOD OF USING

BACKGROUND OF THE INVENTION

1. Field of the Invention

This invention relates to anhydrous monomer compositions crosslinkable by photoinitiators, and to a process for bonding non-transparent, particularly metallic, surfaces therewith.

2. Statement of Related Art

Adhesives based on radically polymerizable systems containing one or more monomers having ethylenically unsaturated double bonds are acquiring increasing significance. Systems such as these frequently contain short-chain, unsaturated carboxylic acid esters, such as methyl methacrylate, cyclohexyl methacrylate or tetrahydrofurfuryl methacrylate, free methacrylic acid, or mixtures of such monomers, methyl methacrylate being the most important component. Reactive adhesives such as these are mostly available both as so-called "two-component adhesives" and also an anaerobic systems.

One disadvantage of anaerobic systems is that they can only be hardened by radical polymerization in the absence of oxygen. In addition, acrylate adhesives formulated as two-component adhesives have limited pot lives.

It is also known that, provided suitable photoinitiators are used, vinyl monomers can be photopolymerized by electromagnetic radiation, cf. J Hutchinson et al., "Advances in Polymer Science" 14, 49 (1974), G. Oster and N. L. Yang, "Chemical Reviews" 68, 125 (1968). However, it has been found that relatively high-energy radiation is required to obtain bonds to good quality, i.e. having high tensile shear strengths, in acceptable setting times. If high-energy radiation cannot be used on technical grounds or if only weak radiation sources are available, long irradiation times have to be accepted. Finally, non-transparent substrates cannot be properly bonded with photoinitiated vinyl monomer systems under the effect of electromagnetic radiation under practical conditions.

U.S. Pat. No. 3,573,922 describes a process for the polymerization of solid, water-soluble vinyl monomers, namely salts and water-soluble amides, in which a catalyst mixture of sensitizer and an organic sulfine, phosphine or arsine compound is added to the monomer mixture and the system is subjected to photopolymerization. According to the specification, it is thus possible to produce layers which may be used as printing plates or the like by polymerization of the exposed areas so that they are resistant to the action of solvents or the like, while unexposed areas are washed out by suitable solvents, so that plates corresponding to the light pattern can be produced. The water-soluble vinyl monomers disclosed in U.S. 3,573,922 are not suitable as a basis for reactive adhesives.

DESCRIPTION OF THE INVENTION

Other than in the operating examples, or where otherwise indicated, all numbers expressing quantities of ingredients or reaction conditions used herein are to be understood as modified in all instances by the term "about".

The present invention relates to a new bonding process based on polymerizable compounds crosslinkable by photoinitiators which are useful as reactive adhesive systems. In the adhesive systems to be used in accordance with the invention, the polymerizing crosslinking reaction takes place by induction of the polymerization by electromagnetic radiation while the polymerization process itself, after initiation, continues without any further irratiation. In this way, the adhesive is able to harden in darkness, for example between metal surfaces or in bonded joints. The polymerization reaction can be induced by irradiation from the visible region of the spectrum. The adhesives are formulated as one-component systems.

Accordingly, the present invention relates to compositions containing:

(a) 30 to 90 parts by weight of at least one liquid, polymerizable monomer containing one or more ethylenic double bonds,
(b) 0.01 to 2 parts by weight of camphor quinone as a photosensitizer,
(c) 0.01 to 5 parts by weight of an aryl sulfinate as a photoinitiator,
(d) 5 to 60 parts by weight of at least one thickener,
(e) 0 to 10 parts by weight, preferably 0.1 to 10 parts by weight of an adhesion promotor, and
(f) 0 to 5 parts by weight, preferably from 0.1 to 5 parts by weight of an accelerator, as photoinitiated adhesives hardening in darkness for the bonding of non-transparent, especially metallic, surfaces.

It is preferred to use compositions containing (a) 40 to 60 parts by weight of one or more polymerizable monomers,
(b) 0.1 to 0.5 part by weight of camphor quinone,
(c) 0.3 to 2.0 parts by weight of an alkali metal-ptoluenesulfinate,
(d) 30 to 60 parts by weight of an at least one thickener,
(e) 0.4 to 8 parts by weight of an adhesion promoter, and
(f) 0.1 to 3 parts by weight of an accelerator.

The compositions to be used in accordance with the invention preferably contain as component (a) at least one polymerizable monomer from the group of compounds corresponding to the general formulae (I) and (II) below

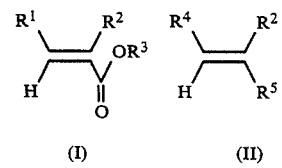

in which $R^1$ and $R^2$ independently of one another represent hydrogen or a methyl group, $R^3$ represents a linear or branched chain alkyl radical containing 1 to 8 carbon atoms or a linear or branched alkyl radical containing 1 to 8 carbon atoms in the alkyl group and substituted by one or more hydroxy or amino groups, or an alkyleneoxy group attached to a phosphate group and containing 1 to 6 carbon atoms in the alkylene group thereof, and $R^4$ and $R^5$ independently of one another represent hydrogen, an alkylenecarboxy group or an ester thereof containing 0 to 4 carbon atoms in the alkylene radical and wherein the esters thereof are esters in accordance with formula I, i.e. the esters are esters of the $R^3$ group as defined above, e.g. $R^4$ and/or $R^5$ can have the formula

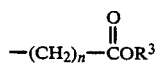

where n=0-4, or an aryl radical optionally substituted by one or more hydrocarbon groups, preferably $C_2$-$C_4$ hydrocarbon groups, containing double bonds, with the proviso that $R^4$ and $R^5$ do not both represent hydrogen at the same time.

Accordingly, preferred polymerizable monomers are compounds of formulae (I) and (II) in which for example $R^3$ represents methyl, ethyl, n-propyl, n-butyl, n-pentyl, n-hexyl, n-heptyl or n-octyl or any branched alkyl radical which is isomeric with the named alkyl radicals. Hence, preferred compounds (I) are esters of unsaturated carboxylic acids which have been formed with straightchain or branched monohydric alcohols. Particularly preferred representatives of this group are, for example, the acrylates and methacrylates or monohydric aliphatic alcohols and also corresponding esters of crotonic acid. In another preferred embodiment, the polymerizable monomers are compounds of formula (I) in which the radical $R^3$ is linear or branched methyl, ethyl, propyl, butyl, pentyl, hexyl, heptyl or octyl group substituted by one or more hydroxy or amino groups. This means that the esters of unsaturated carboxylic acids with difunctional or polyfunctional hydroxy or hydroxyamino compounds are used as the compounds (I). Particularly preferred compounds of this type are the acrylic, methacrylic, or crotonic acid esters of polyhydric aliphatic alcohols and/or aminoalcohols.

In another preferred embodiment, the compositions of the invention contain compounds of general formula (I) in which $R^3$ represents linear or branched methoxy, ethoxy, propoxy, butoxy, pentoxy, or hexoxy groups, i.e. alkoxy groups containing 1 to 6 carbon atoms in the linear or branched alkylene radical, attached to phosphate groups. Accordingly, polymerizable monomers such as these corresponding to general formula (I) are double esters of one of the above-mentioned unsaturated carboxylic acids and phosphoric acid.

In another preferred embodiment, the compositions of the invention contain polymerizable monomers of formula (II) in which $R^2$—as above in general formula (I)—represents hydrogen or a methyl group, and $R^4$ and $R^5$ independently of one another represent hydrogen, alkylenecarboxy groups containing 0 to 4 carbon atoms in the alkylene radical of the associated carboxylic acids, or aryl radical optionally substituted by groups containing double bonds. Accordingly, the compounds of general formula (II) can be derivatives of dicarboxylic acids, for example maleic acid. In this case, $R^2$ in general formula (II) above represents hydrogen while $R^4$ and $R^5$ each represent a carboxy group, i.e. an alkylenecarboxy group as defined above containing 0 carbon atoms in the alkylene radical thereof. Equally, $R^4$ and $R^5$ can of course also be alkylenecarboxy groups containing 1 to 4 carbon atoms in the alkylene radical thereof. Of the above-mentioned derivatives of maleic acid, which according to the invention can be used as the polymerizable monomer in the compositions, it is preferred to use esters thereof with monofunctional or polyfunctional hydroxy compounds. As in the case of the acrylates and methacrylates mentioned above, monohydric or even higher alcohols can be employed for the ester groups. In addition to derivatives of unsaturated dicarboxylic acids, however, the polymerizable monomer in the compositions according to the invention can also be a compound of general formula (II) in which $R^4$ represents an aryl radical which can be substituted by one or more groups containing double bonds, e.g. styrene or divinyl benzene; these compounds are also particularly preferred as polymerizable monomers in the compositions according to the invention. However, $R^4$ and $R^5$ can also be higher, and optionally substituted higher, aryl radicals.

In one particularly preferred embodiment, the compositions to be used in accordance with the invention contain methyl methyacrylate as the polymerizable monomer; which gives satisfactory to good shear strengths.

The camphor quinone used as component (b) as a photosensitizer in the compositions to be used in accordance with the invention is known in state-of-the-art polymerizable systems. In accordance with the present invention, for the first time a composition containing camphor quinone can be used in the bonding of non-transparent substrates, being used in conjunction with a photoinitiator activatable by the transfer of energy through the sensitizer, namely an alkali metal-p-toluenesulfinate, particularly the lithium and sodium compounds thereof. Systems such as these are neither known nor obvious in the field of adhesives particularly for one-component adhesives. The small quantities of sensitizer and initiator to be used in accordance with the invention are entirely sufficient for absorbing and transferring the electromagnetic radiation supplied to the system from outside and, hence, of passing it on to individual monomers to initiate the polymerization reaction.

The aryl sufinates employed as component (c) in the compositions of the invention are alkali metal salts or optionally substituted ammonium salts, particularly sodium, potassium, lithium, ammonium and mono- or di-($C_2$-$C_4$ alkyl)-substituted ammonium salts of aryl sulfinic acids, particularly toluene-, xylene-, chlorobenzene- or chlorotoluene-sulfinic acid.

Standard thickeners (component (d)) for use in accordance with the invention include any - normally polymeric - highly viscous additives which are used added to compositions used in adhesive systems. Polymethyl methacrylate is preferably used as the standard thickener, although it is also possible to use highly disperse silica as the thickener, either alone or in addition to polymethyl methacrylate.

Methacrylic acid or acrylic acid is normally additionally added as the optional adhesion promoter (component (e)). The compositions can also contain other adhesion promoters, such as for example copolymerizable (meth)acrylate monomers containing polar groups, for example hydroxyethyl (meth)acrylates.

In another preferred embodiment of the present invention, a standard accelerator (optional component (b)) is added to the compositions where particularly fast hardening times are required. Particularly preferred standard accelerators include 4-dimethylaminobenzoic acid, 4-dimethylaminobenzoic acid ethyl ester, 4-dimethylaminobenzaldehyde, 2-mercaptobenzthiazole, 2-mercaptobenzoxazole, 2-mercaptobenzimidazole, p-tolylaldehyde, terephthaldehyde and lauric aldehyde.

The particular advantage of the compositions of the invention lies in the fact that brief irradiation of the present compositions with light from the visible wavelength range is sufficient to initiate the polymerization process, i.e. crosslinking, after which—in contrast to all other hitherto—known systems of this type—the polymerization process continues after the irradiation. This means that brief irradiation of the mixtures is sufficient to initiate crosslinking, i.e. the beginning of the bonding process, although thereafter the polymerization mixture continues to react even in darkness. This advantageously enables the compositions according to the invention to be used as adhesive systems for bonding non-transparent substrates. In contrast to all other adhesive systems of comparable composition, which have to be irradiated throughout the entire hardening process and, accordingly, are only suitable for the bonding of transparent substrates, the compositions according to the invention are able to continue reacting even in the darkness of the bonded joint and thus enable even non-transparent substrates to be bonded.

As stated above, it has not previously been possible to harden adhesive systems of the present type without permanent irradiation. The composition according to the invention now enables this to be done in a simple and technically convenient form. The compositions according to the invention give tensile shear strengths comparable with those achieved by hitherto known adhesives requiring permanent irradiation. In addition, it is a considerable advantage from the user's point of view that the compositions according to the invention are formulated as one-component systems and, hence, are considerably easier to handle in use.

The present invention also relates to a process for the bonding of non-transparent, particularly metallic, surfaces, in which the surfaces to be bonded are coated with the compositions of the invention, exposed for about 1 to 3 minutes either to daylight or to the radiation of a corresponding, artificial light source, after which the surfaces are joined together and subjected for 2 to 24 hours to a pressure of 1 to 200 MPa.

The invention is illustrated but not limited by the following Examples in which the abbreviations used have the following meanings:

| | |
|---|---|
| MMA = | methyl methacrylate |
| PMMA = | polymethylmethacrylate |
| CQ = | camphor quinone |
| NAS = | sodium p-toluenesulfinate |
| LIS = | lithium p-toluenesulfinate |
| MAA = | methacrylic acid |
| Phos.GMA = | reaction product of phosphoric acid and glycidyl methacrylate 1:1 |
| JPA = | reaction product of phosphorus oxychloride and hydroxyethyl methacrylate 1:1 |
| TSS = | tensile shear strength of Fe/Fe bonds after 24 hours in N/mm$^2$ (DIN 53 281/3) |

EXAMPLES

EXAMPLE 1

A mixture was prepared from 45 parts by weight MMA and 40 parts by weight PMMA.

0.2 part by weight CQ was added to 50 parts by weight of the above mixture of MMA and PMMA, which was then stirred in darkness.

To another 50 parts by weight of the above mixture of MMA and PMMA, 1.5 parts by weight LIS were added and the resulting mixture stirred in darkness.

The mixture of MMA, PMMA, and CQ and the mixture of MMA, PMMA, and LIS, which mixtures were in the form of solutions no longer containing any dissolved solids, were mixed together in darkness with simultaneous addition of 7.0 parts by weight MAA and stirred vigorously for 20 minutes.

Degreased iron plates surface-treated by sandblasting were coated on both sides with the composition prepared above and, after exposure to daylight (1 minute), were placed one on top of the other over an area of 250 mm$^2$ and fixed in a wooden clamp.

The tensile shear strengths of the bonds thus established was determined in accordance with DIN 53 281/3. The results are shown in Table 1.

EXAMPLES 2 to 9

Adhesive mixtures were prepared using various additives in the same way as described in Example 1. The mixing ratios and also the tensile shear strengths of the resulting bonds are given in Table 1.

TABLE 1

| Example | CQ | NAS | LIS | MAA | JPA | Phos. GMA | TSS (N/mm$^2$) |
|---|---|---|---|---|---|---|---|
| 1 | 0.2 | — | 1.5 | 7.0 | | | 10.6 |
| 2 | 0.6 | 2.0 | — | | 2.0 | | 28.5 |
| 3 | 0.2 | — | 2.0 | | | 4.0 | 13.0 |
| 4 | 0.6 | — | 1.5 | | 4.0 | | 13.1 |
| 5 | 0.2 | 1.0 | — | | 0.5 | | 16.2 |
| 6 | 1.0 | — | 1.5 | | | 4.0 | 15.4 |
| 7 | 0.2 | — | 0.2 | | 2.0 | | 13.4 |
| 8 | 0.2 | — | 0.8 | | 4.0 | | 19.3 |
| 9 | 1.0 | 1.0 | — | | 2.0 | | 16.6 |

EXAMPLES 10 to 13

Formulations containing primers

Adhesive systems were prepared in the same way as in Example 1, containing 0.5 part by weight CQ, and either 0.6 part by weight LIS or 0.7 part by weight NAS to 100 parts by weight of a mixture of 45 parts by weight MMA and 40 parts by weight PMMA. In addition, MAA and JPA were added in different concentration as primers. The results obtained are shown in Table 2 where the quantities are again given in parts by weight.

TABLE 2

| Example | Initiator | MAS | JPA | TSS (N/mm$^2$) |
|---|---|---|---|---|
| 10 | LIS | 1.0 | 0.4 | 18.6 |
| 11 | LIS | 3.0 | 0.4 | 14.9 |
| 12 | NAS | 1.0 | 0.4 | 17.6 |
| 13 | NAS | 3.0 | 0.4 | 13.3 |

EXAMPLES 14 to 22

As in Example 1, different quantities of accelerators were added to a combined mixture of 90 parts by weight MMA, 80 parts by weight PMMA, 1 part by weight JPA, 0.5 part by weight NAS and 0.5 part by weight CQ. The individual formulations and also the tensile shear strengths determined are given in Table 3 where quantities are in parts by weight.

TABLE 3

| Example | | TSS (N/mm²) | |
|---|---|---|---|
| 14 | 4-dimethylaminobenzoic acid | 0.5 pbw | 29.0 |
| 15 | 4-dimethylaminobenzoic acid ethyl ester | 0.5 pbw | 30.1 |
| 16 | 4-dimethylaminobenzaldehyde | 0.5 pbw | 27.7 |
| 17 | 2-mercaptobenzthiazole | 0.5 pbw | 18.9 |
| 18 | 2-mercaptobenzoxazole | 0.5 pbw | 31.4 |
| 19 | 2-mercaptobenzimidazole | 0.5 pbw | 25.0 |
| 20 | p-tolylaldehyde | 1.0 pbw | 27.3 |
| 21 | terephthaldehyde | 1.0 pbw | 32.7 |
| 22 | lauric aldehyde | 2.0 pbw | 25.2 |

We claim:

1. A method for bonding metal surfaces together comprising the steps of
I. coating one or both surfaces with an adhesive composition which consists of
A. from about 30 to about 90 parts by weight of at least one liquid polymerizable monomer of the formula

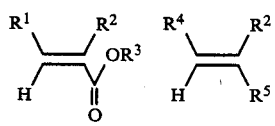

(I)  (II)

wherein $R^1$ and $R^2$ independently of one another are hydrogen or a methyl group, $R^3$ is a $C_1$-$C_8$ linear or branched chain alkyl radical, or a $C_1$-$C_8$ linear or branched chain alkyl group substituted by at least one hydroxy or amino group, $R^4$ and $R^5$ independently of one another are hydrogen, an alkylenecarboxy group containing 0 to 4 carbon atoms in the alkylene radical or an ester thereof with an $R^3$ group, an aryl radical, or an aryl radical substituted by at least one $C_2$-$C_4$ hydrocarbon group containing a double bond, with the proviso that $R^4$ and $R^5$ are not both hydrogen;
B. from about 0.01 to about 2 parts by weight of camphor quinone;
C. from about 0.01 to about 5 parts by weight of an aryl sulfinate;
D. from about 5 to about 60 parts by weight of a thickener which is polymethyl methacrylate, highly disperse silica, or a mixture of the foregoing;
E. from 0 to about 10 parts by weight of an adhesion promoter which is methacrylic acid, acrylic acid, hydroxyethyl (meth) acrylate, or a mixture of two or more of the foregoing; and
F. from 0 to about 5 parts by weight of an accelerator which is at least one of 4-dimethylaminobenzoic acid, 4-dimethylaminobenzoic acid ethyl ester, 4-dimethylaminobenzaldehyde, 2-mercaptobenzthiazole, 2-mercaptobenzoxazole, 2-mercaptobenzimidazole, p-tolylaldehyde, terephthaldehyde, and lauric aldehyde,
II. exposing the coated surfaces for from about 1 to about 30 minutes to daylight or to an artificial visible light source to initiate the polymerization of the adhesive composition,
III. joining the surfaces exposed to said daylight or to said artificial visible light source together, and
IV. subjecting the joined surfaces to a pressure of from about 1 to about 200 MPa for a period of from about 2 to about 24 hours.

2. The method of claim 1 wherein in step I the adhesive composition consists of
A. from about 40 to about 60 parts by weight of at least one liquid polymerizable monomer of the formula

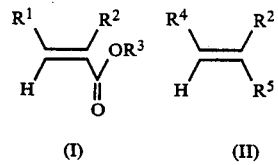

(I)  (II)

wherein $R^1$ and $R^2$ independently of one another are hydrogen. or a methyl group, $R^3$ is a $C_1$-$C_8$ linear or branched chain alkyl radical, or a $C_1$-$C_8$ linear or branched chain alkyl group substituted by at least one hydroxy or amino group, $R^4$ and $R^5$ independently of one another are hydrogen, an alkylenecarboxy group containing 0 to 4 carbon atoms in the alkylene radical or an ester thereof with an $R^3$ group, an aryl radical, or an aryl radical substituted by at least one $C_2$-$C_4$ hydrocarbon group containing a double bond, with the proviso that $R^4$ and $R^5$ are not both hydrogen;
B. from about 0.1 to about 0.5 parts by weight of camphor quinone;
C. from about 0.3 to about 2.0 parts by weight of an aryl sulfinate;
D. from about 30 to about 60 parts by weight of a thickener which is polymethyl methacrylate, highly disperse silica, or a mixture of the foregoing;
E. from about 0.4 to about 8 parts by weight of an adhesion promoter which is methacrylic acid, acrylic acid, hydroxyethyl (meth) acrylate, or a mixture of two or more of the foregoing; and
F. from about 0.1 to about 3 parts by weight of an accelerator, which is at least one of 4-dimethylaminobenzoic acid, 4-dimethylaminobenzoic acid ethyl ester, 4-dimethylaminobenzaldehyde, 2-mercaptobenzthiazole, 2-mercaptobenzoxazole, 2-mercaptobenzimidazole, p-tolylaldehyde, terephthaldehyde, and lauric aldehyde.

3. The method of claim 1 wherein in component E. of the adhesive composition from about 0.1 to about 10 parts by weight of an adhesion promoter are present.

4. The method of claim 1 wherein in component F. of the adhesive composition from about 0.1 to about 5 parts by weight of an accelerator are present in the composition.

5. The method of claim 4 wherein in component F. from about 0.1 to about 3 parts by weight of an accelerator are present in the composition.

6. The method of claim 1 wherein component C. of the adhesive composition is an alkali metal p-toluene sulfinate.

7. The method of claim 1 wherein component A. of the adhesive composition is at least one of the following: an acrylate or methacrylate of a monohydric or polyhydric aliphatic alcohol, an acrylate or methacrylate of a polyfunctional hydroxy compound, a crotonic acid ester or maleic acid ester of a monohydric or polyhydric aliphatic alcohol, vinyl acetate, divinyl benzene, and styrene.

8. The method of claim 1 wherein component D. in the adhesive composition is polymethyl methacrylate.

* * * * *